(12) United States Patent
Mark et al.

(10) Patent No.: US 6,285,954 B1
(45) Date of Patent: Sep. 4, 2001

(54) COMPENSATION SYSTEM

(75) Inventors: John G. Mark, Pasadena; Daniel A. Tazartes, West Hills, both of CA (US)

(73) Assignee: Litton Systems Inc., Woodland Hills, CA (US)

( * ) Notice: Subject to any disclaimer, the term of this patent is extended or adjusted under 35 U.S.C. 154(b) by 0 days.

(21) Appl. No.: 09/358,630

(22) Filed: Jul. 21, 1999

(51) Int. Cl.⁷ ...................................................... G05D 1/00
(52) U.S. Cl. ...................... 701/221; 701/220; 342/357.14
(58) Field of Search ..................................... 701/221, 224, 701/226, 220; 342/357.12, 357.14; 702/94.95

(56) References Cited

U.S. PATENT DOCUMENTS 5,422,817 * 6/1995 Tazartes et al. ........................ 702/6
5,505,410 * 4/1996 Diesel et al. ........................ 244/195
5,890,093 * 3/1999 Mark et al. ........................... 701/220

* cited by examiner

Primary Examiner—Tan Nguyen
(74) Attorney, Agent, or Firm—Robert E. Malm

(57) ABSTRACT

The invention is a method and apparatus for obtaining an accurate value $x_{1c}$ of a variable $x_1$ based on an estimate $x_{1e}$ that is a function of K variables $x_1, x_2, \ldots, x_k, \ldots, x_K$. The method comprises the steps of (a) obtaining a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, the values of the variables $x_1, x_2, \ldots, x_k, \ldots, x_K$ changing or being changed during the method-execution time period; (b) obtaining from an external source the actual values $x_{1a}$ of $x_1$ during the method-execution time period; (c) defining a compensation model $\delta x_1$ that is a function of one or more of the estimates $x_{1e}, x_{2e}, \ldots, x_{ke}, \ldots x_{Ke}$ of the variables $x_1, x_2, \ldots, x_k, \ldots, x_K$, the compensation model being further defined by I unknown constants $a_1, a_2, \ldots, a_i, \ldots, a_I$; (d) applying an operator G to the values of $x_{1e}-x_{1a}$ and $\delta x_1$; (e) determining the values of $a_1, a_2, \ldots, a_i, \ldots, a_I$; and (f) determining the value of $x_{1c}$.

30 Claims, 2 Drawing Sheets

COMPENSATION SYSTEM

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of contract No. DAAH01-95-C-R156 awarded by U.S. Dept of the Army.

This invention was made with support under Contract No. DAAH01-95-C-R156 awarded by the U.S. Department of the Army, Army Missile Command. The Government of the United States of America has certain rights in this inventions.

CROSS-REFERENCE TO RELATED APPLICATIONS (Not applicable)

BACKGROUND OF THE INVENTION

The invention relates generally to inertial navigation systems and more specifically to sensors used in such systems to measure the values of environmental variables and the compensation of such sensors for variations in other environmental variables.

Strapdown inertial navigation systems are frequently used in missiles and aircraft. Physically isolated and stabilized apparatus, such as a gimballed platform that is physically angularly-stabilized relative to the local vertical direction, require precise and mechanically complex angle positioning apparatus, and are being systematically replaced by systems of the strapdown type.

A state-of-the-art strapdown inertial navigation system has three rotation sensors or gyros and three accelerometers rigidly attached to a supporting vehicle. The rotation sensors are each positioned and oriented to sense angular displacement about one of three defined orthogonal axes attached to the vehicle body and known as the body coordinate system. The accelerometers are each positioned and oriented in a fixed direction relative to the vehicle, to sense velocity changes (incremental velocities) along different ones of the three defined orthogonal axes. In a strapdown system, the accelerometer axes are not angularly stabilized.

Because the accelerometers are constantly changing direction relative to gravity, navigation velocities cannot be computed by directly integrating the accelerometer signals. Instead, a stable computational frame or analytic navigation coordinate system is continually generated. The output signals from the rotation sensors are used by an attitude integration apparatus to calculate the directions of local vertical, together with two other axes orthogonal to the local vertical direction.

Sensed angle changes and accelerations (incremental velocities) are continually rotated through the calculated angles from the vehicle body axes to the calculated navigation axes. Angle signals from the rotation sensors are used to update the computer-stored angular position and incremental velocity data for both the angle sensors and accelerometers relative to the navigation coordinate system.

The rotation sensors and accelerometers have fixed relative directions in the body coordinate system. An angular transformation matrix of direction cosines is computed in an attitude integration apparatus. The accelerometer signals, which are incremental changes in velocity, in the strapdown body coordinate system are converted in a coordinate transformation computer from that system into corresponding signals in the stabilized navigation coordinate system.

After transformation into the navigation coordinate system, the incremental velocity signals are integrated or summed to form updated velocity signals. The rotation sensor and accelerometer signals are sampled, and the sampled signals are delivered to a computer which is programmed to accept the signals and to calculate both velocities along the three axes in the stabilized navigation coordinate system and attitude angles relative to this system.

The estimate $x_{1e}$ produced by a sensor of an environmental variable $x_1$ may be affected by the values of other environmental variables $x_2, x_3, \ldots, x_K$ such as temperature, pressure, and humidity and possibly first and even higher-order time derivatives of such variables. To achieve the ultimate measurement accuracy, the output $x_{1e}$ of such a sensor is compensated for variations in these other environmental variables by means of a compensation model $\delta x_1$ $(x_{1e}, x_{2e}, x_{3e}, \ldots, x_{Ke})$ where $x_{1e}, x_{2e}, x_{3e}, \ldots, x_{Ke}$ are the outputs from sensors that result respectively from the sensor inputs $x_1, x_2, x_3, \ldots, x_K$. The compensated output $x_{1c}$ is given by $$x_{1c} = x_{1e} - \delta x_1 \qquad (1)$$

Note that the compensation model $\delta x_1$ may be a function of $x_1$. The compensation model can be expressed as $$\delta x_1 = \sum_i a_i f_i(x_{ie}) \qquad (2)$$

The quantity $x_{ie}$ denotes a particular set of the variables of interest $x_{1e}, x_{2e}, x_{3e}, \ldots, x_{Ke}$. The set may be different for each value of i. The function $f_i(x_{ie})$ is a function of the one or more variables in the set $x_{ie}$ associated with the index i. The symbols $a_i$ denote quantities that are constant, at least over the short term.

We can rewrite equation (1) as $$x_{1c} - x_{1a} = x_{1e} - x_{1a} - \delta x_1 \qquad (3)$$

where $x_{1a}$ is the actual value of $x_1$ supplied by an external source. We wish to choose the coefficients $a_i$ so that $x_{1c}$ is an accurate estimate of $x_1$. We do this by finding the values which minimize a statistical measure of the magnitude of $$x_{1e} - x_{1a} - \sum_i a_i f_i(x_{ie})$$

for a variety of values for $x_1, x_2, x_3, \ldots, x_K$. A suitable statistical measure might be the sum of the squares of $$x_{1e} - x_1 - \sum_i a_i f_i(x_{ie})$$

for the variety of values for $x_1, x_2, x_3, \ldots, x_K$.

The sensor outputs may be noisy and it may be desirable for the purpose of minimizing the computational requirements to apply a noise-reducing operator G to the sensor outputs prior to determining the values of $a_i$. The operator G transforms the values of a sensor output associated with times extending from present time minus a predetermined time interval T to present time into a single present-time value. An example of an operator G operating on a function x(t) is provided by a lowpass filter which is described mathematically by the equation $$Gx(t) = \int_0^\infty x(t-t')h(t')dt' \quad (4)$$

where the function h(t) is the impulse response of the filter and is essentially zero for times greater than T. For some cases, the operator G may be nonlinear: $G(x_1+x_2)$ may not be equal to the sum of $Gx_1$ and $Gx_2$.

Applying G to equation (3), $$G(x_{1c}-x_{1a}) = G(x_{1e}-x_{1a}-\delta x_1) \quad (5)$$

A relatively simple approach to determining a compensation model is to assume G to be reasonably linear. We also assume $Gx_{k_e}$ to be equal to $x_{k_e}$ at times T after a change in the values of one or more of the sensor inputs $x_1, x_2, \ldots, x_k, \ldots, x_K$ in the absence of noise. Then at such times T, $$G(x_{1c}-x_{1a}) = Gx_{1e} - x_{1a} - \sum_i a_i f_i(Gx_{ie}) \quad (6)$$

where the notation $Gx_{ie}$ means that each $x_{ke}$ in the functional representation is replaced by $Gx_{ke}$.

We determine the values of the coefficients $a_i$ by finding the values which minimize a statistical measure of the magnitude of $$Gx_{1e} - x_{1a} - \sum_i a_i f_i(Gx_{ie})$$

using the values obtained at times T after changes in the values of $x_i$.

This process for determining the a's may be difficult, inconvenient, and inadequate for several reasons. First of all, the process is time-consuming since $x_1, x_2, x_3, \ldots, x_K$ must be held constant for time intervals T. Second, the calibration must sometimes include variables that are time derivatives of other variables. One cannot hold a variable constant if the time derivative of the variable is required to take on values other than zero.

A calibration process is needed that does not require the variables affecting the output of a sensor to be held constant for time periods T during the execution of the calibration process.

BRIEF SUMMARY OF THE INVENTION

The invention is a method and apparatus for obtaining an accurate value $x_{1c}$ of a variable $x_1$ based on an estimate $x_{1e}$ that is a function of K variables $x_1, x_2, \ldots, x_k, \ldots, x_K$. The method comprises the steps of (a) obtaining a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, the values of the variables $x_1, x_2, \ldots, x_k, \ldots, x_K$ changing or being changed during the method-execution time period; (b) obtaining from an external source the actual values $x_{1a}$ of $x_1$ during the method-execution time period; (c) defining a compensation model $\delta x_1$ that is a function of one or more of the estimates $x_{1e}, x_{2e}, \ldots, x_{ke}, \ldots, x_{Ke}$ of the variables $x_1, x_2, \ldots, x_k, \ldots, x_K$, the compensation model being further defined by I unknown constants $a_1, a_2, \ldots, a_i, \ldots, a_I$; (d) applying an operator G to the values of $x_{1e}-x_{1a}$ and $\delta x_1$; (e) determining the values of $a_1, a_2, \ldots, a_i, \ldots, a_I$; and (f) determining the value of $x_{1c}$.

DETAILED DESCRIPTION OF THE INVENTION

Figure 1:
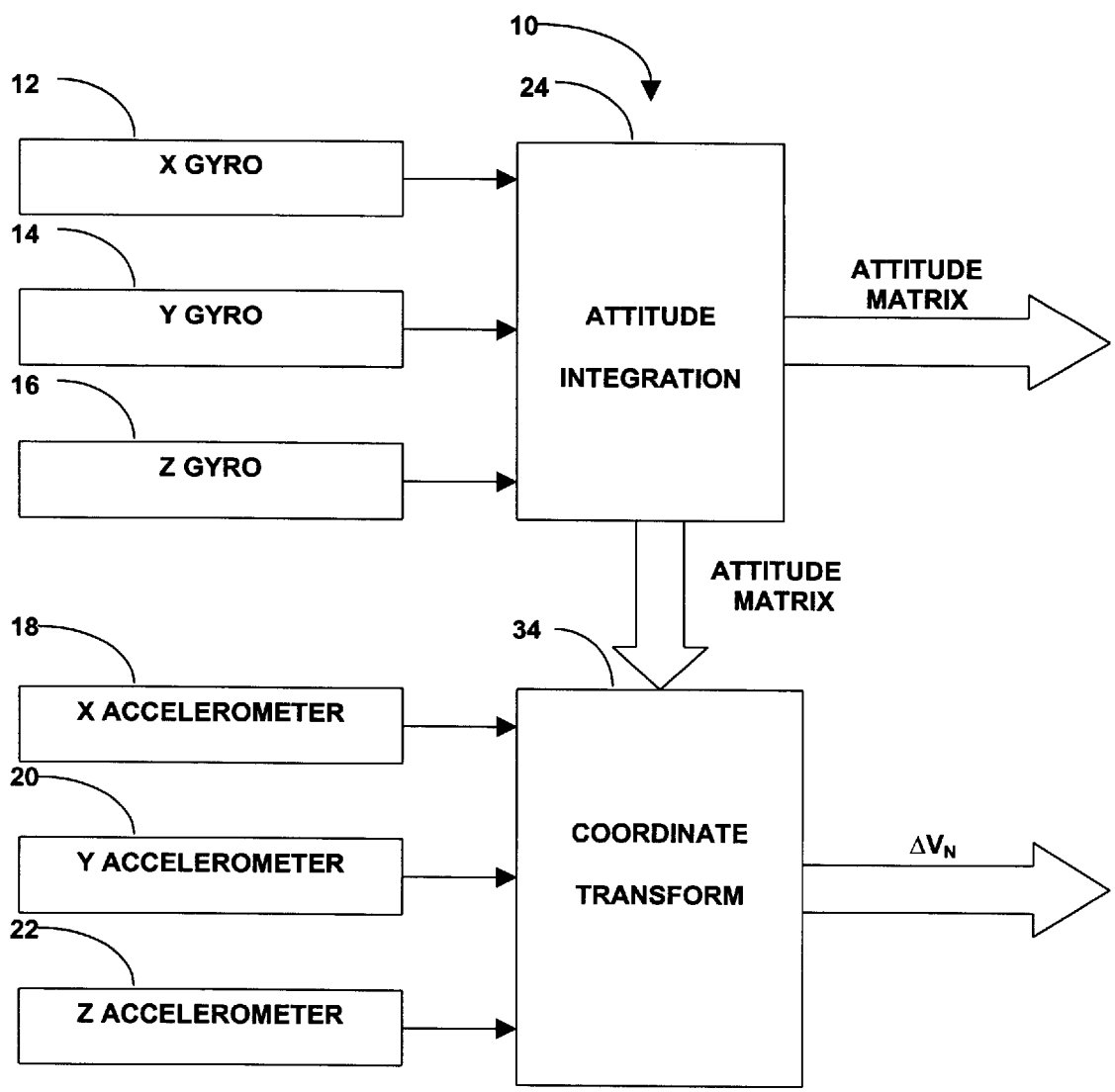
FIG. 1 is a block diagram of the program that controls the operations of a digital processor in a strapdown inertial navigation system showing the entry of sensor data.

A navigation solution is obtained in a strapdown inertial navigation system by a digital processor in accordance with instructions listed in a program stored in memory. The program 10 comprises a number of program segments, some of which are shown in FIG. 1. Angle-of-rotation inputs for the navigation solution are provided by x-gyro 12, y-gyro 14, and z-gyro 16 which measure angles of rotation about the $x_B$, $y_B$, and $z_B$ axes in a body coordinate system fixed in the vehicle which carries the navigation system. Acceleration inputs are provided by x-accelerometer 18, y-accelerometer 20, and z-accelerometer 22.

The changes in angles measured by the gyros during a sampling interval are supplied to the digital processor at the end of each sampling interval, and the program segment 24 causes the matrix representing the attitude of the body coordinate system relative to the navigation coordinate system with coordinates $x_N$, $y_N$, and $z_N$ to be updated.

The accelerometer outputs, which represent the change in velocity $\Delta V_B$ of the body expressed with respect to the $x_B$, $y_B$, and $z_B$ coordinates in the body coordinate system during a sampling interval, are transformed to the change in velocity $\Delta V_N$ expressed in navigation coordinates by program segment 34.

Figure 2:
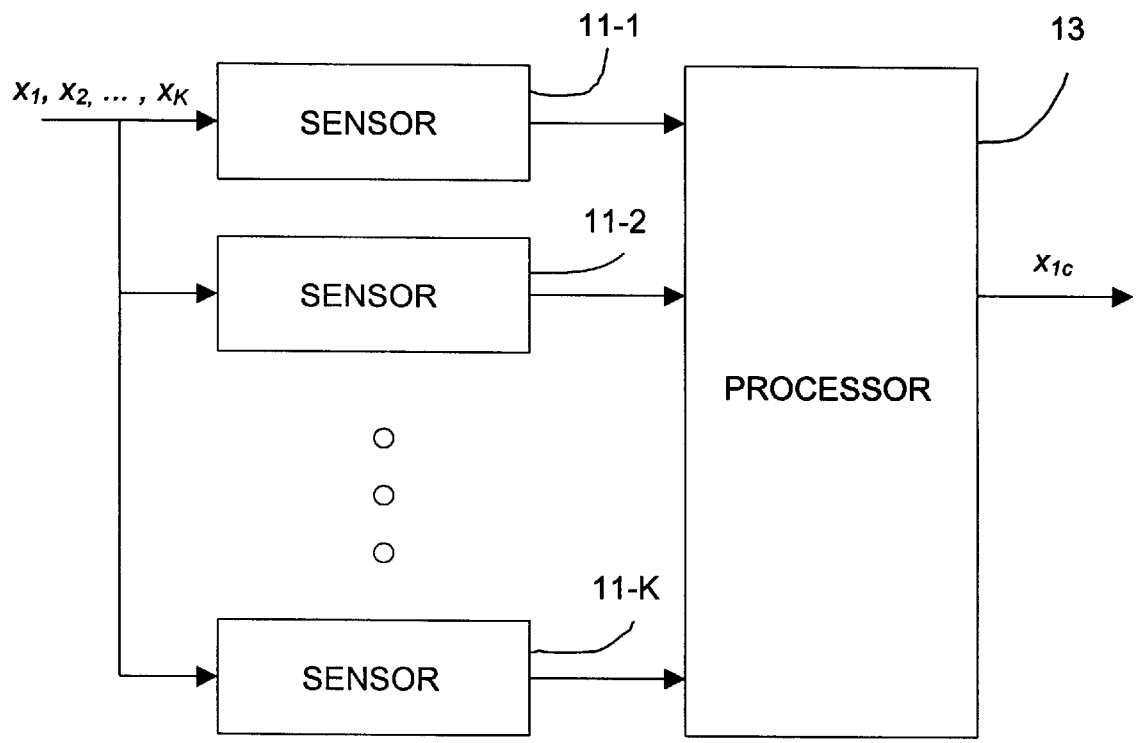
FIG. 2 is a block diagram of the invention.

A block diagram of the invention is shown in FIG. 2. The environmental variables $x_1, x_2, x_3, \ldots, x_K$ that affect the outputs of sensors 11-1, 11-2, ..., 11-K are shown as inputs to the sensors 11-k, k being an integer between 1 and K. The outputs of the sensors are estimates $x_{1e}, x_{2e}, x_{3e}, \ldots, x_{Ke}$ of the inputs $x_1, x_2, x_3, \ldots, x_K$ and are inputs to processor 13. The sensor 11-k produces an output that is primarily a reflection of the value of $x_k$ but may be influenced by the values of zero or more of the other variables.

We assume that the variable that is to be compensated for variations in the values of the other variables is $x_1$. The processor 13 outputs an accurate estimate $x_{1c}$ of $x_1$ utilizing the output $x_{1e}$ of sensor 11-1 and the outputs $x_{2e}, x_{3e}, \ldots, x_{Ke}$ of sensors 11-2, ..., 11-K. Typical examples of sensor 11-1 are x-gyro 12, y-gyro 14, z-gyro 16, x-accelerometer 18, y-accelerometer 20, and z-accelerometer 22 shown in FIG. 1. The x-gyro 12, y-gyro 14, and z-gyro 16 measure angles of rotation about the $x_B$, $y_B$, and $z_B$ axes in a body coordinate system fixed in the vehicle which carries the navigation system. Acceleration inputs are provided by x-accelerometer 18, y-accelerometer 20, and z-accelerometer 22.

We assume for simplicity that the outputs of sensors 11-2, ..., 11-K are reasonably good estimates $x_{2e}, x_{3e}, \ldots, x_{Ke}$ of $x_2, x_3, \ldots, x_K$. If this were not the case, a better estimate of any particular variable $x_k$ could be obtained by following the procedure described below for obtaining an improved estimate of $x_1$. We also assume that the actual value $x_{1a}$ of $x_1$ is available from an external source.

The processor 13 obtains the estimate $x_{1c}$ by determining the value of $\delta x_1$, the compensation model for sensor 11-1. The compensation model $\delta x_1$ is a function of $x_{1e}, x_{2e}, \ldots, x_{Ke}$ and is determined by the processor 13 as a separate task.

Returning to equation (5) and assuming G is linear, we obtain the equation $$G(x_{1c} - x_{1a}) = G(x_{1e} - x_{1a}) - \sum_i a_i G f_i(x_{ie}) \qquad (7)$$

We determine the values of the coefficients $a_i$ by finding the values which minimize a statistical measure of the magnitude of $$G(x_{1e} - x_{1a}) - \sum_i a_i G f_i(x_{ie})$$

for a variety of values for $x_{1e}, x_{2e}, x_{3e}, \ldots, x_{Ke}$. With this formulation, there is no requirement that the variables be constant for some predetermined time period T.

If the nonlinear effects of G are sufficiently large, it may be desirable to refine the solution based on equation (7). In order to obtain a more accurate solution for the compensation model, we rewrite equation (1) as $$x_{1c} = x_{1e} - \delta x_1 - \delta \delta x_1 \qquad (8)$$

where $\delta x_1$ is determined by the process just described and $$\delta \delta x_1 = \sum_i \delta a_i f_i(x_{ie}) \qquad (9)$$

The values of the coefficients $\delta a_i$ are determined in the following way. Rewriting equation (8), we obtain $$x_{1c} - x_{1a} = x_{1e} - x_{1a} - \delta x_1 - \delta \delta x_1 \qquad (10)$$

Applying the G operator, we obtain $$G(x_{1c} - x_{1a}) = G(x_{1e} - x_{1a} - \delta x_1) - G \delta \delta x_1 \qquad (11)$$

Since the quantities in parentheses as well as $\delta \delta x_1$ are small, we may replace the G operator by its linearized version G*:

$$G^*(x_{1c} - x_{1a}) = G^*(x_{1e} - x_{1a} - \delta x_1) - G^* \delta \delta x_1 \qquad (12)$$

or $$G*(x_{1c} - x_{1a}) = G*(x_{1e} - x_{1a} - \delta x_1) - \sum_i \delta a_i G * f_i(x_{ie}) \qquad (13)$$

We determine the values of the coefficients $\delta a_i$ by finding the values which minimize a statistical measure of the magnitude of $$G*(x_{1e} - x_{1a} - \delta x_1) - \sum_i \delta a_i G * f_i(x_{ie})$$

for a variety of values for $x_1, x_2, x_3, \ldots, x_K$. After the values of the coefficients $\delta a_i$ have been determined, a compensation model $\delta x_{1o}$ for operational use is obtained using the equation $$\delta x_{1o} = \sum_i (a_i + \delta a_i) f_i(x_{ie}) \qquad (14)$$

What is claimed is:

1. A method for obtaining an accurate value $x_{1c}$ of a variable $x_1$ based on an estimate $x_{1e}$ that is a function of K variables $x_1, x_2, \ldots, x_k, \ldots, x_K$, the method comprising the steps:

(a) obtaining from a plurality of sensors a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, the values of the variables $x_1, x_2, \ldots, x_k, \ldots, x_K$ changing or being changed during the method-execution time period;

(b) obtaining from an external source the actual values $x_{1a}$ of $x_1$ during the method-execution time period;

(c) defining a compensation model $\delta x_1$ that is a function of one or more of the estimates $x_{1e}, x_{2e}, \ldots, x_{ke}, \ldots, x_{Ke}$ of the variables $x_1, x_2, \ldots, x_k, \ldots, x_K$, the compensation model being further defined by I unknown constants $a_1, a_2, \ldots, a_i, \ldots, a_I$;

(d) applying an operator G to the values of $x_{1e} - x_{1a}$ and $\delta x_1$;

(e) determining the values of $a_1, a_2, \ldots, a_i, \ldots, a_I$;

(f) determining the value of $x_{1c}$.

2. The method of claim 1 wherein in step (a) at least one of the variables is a time derivative of another variable.

3. The method of claim 1 wherein step (c) comprises the steps:

(c1) defining a set of I basis functions $f_i(x_{ie})$, the compensation model being the sum over i of $a_i f_i(x_{ie})$, $x_{ie}$ denoting a set of one or more of the estimates $x_{1e}, x_{2e}, \ldots, x_{ke}, \ldots, x_{Ke}$.

4. The method of claim 3 wherein one or more of the basis functions are polynomials.

5. The method of claim 1 wherein in step (d) the values of $x_{1e} - x_{1a}$ and $\delta x_1$ obtained prior to present time minus a specified time T contribute negligibly to present-time values of $G(x_{1e} - x_{1a})$ and $G \delta x_1$.

6. The method of claim 1 wherein in step (d) $G(x_j + x_k)$ does not equal $G(x_j) + G(x_k)$, j and k being integers less than or equal to K.

7. The method of claim 1 wherein step (e) comprises the step:

(e1) finding the values of $a_i$ that minimize a statistical measure of the magnitude of $G(x_{1e} - x_{1a}) - G \delta x_1(x_{ie})$ for the values of $x_{ie}$ determined in step (a).

8. The method of claim 1 wherein step (e) comprises the step:

(e1) finding the values of $a_i$ which minimize a statistical measure of the magnitude of $$G(x_{1e} - x_{1a}) - \sum_i a_i G f_i(x_{ie})$$

for the values of $x_{ie}$ determined in step (a).

9. The method of claim 1 wherein in step (f) the value of $x_{1c}$ is determined by subtracting $\delta x_1(x_{ie})$ from $x_{1e}$.

10. The method of claim 1 wherein $x_{1e}$ is equal to $x_{1em}$ minus $\delta$, $x_{1em}$ being a measured value of $x_1$, $\delta$ being a predetermined function of one or more of estimates $x_{1e}, x_{2e}, \ldots, x_{ke}, \ldots, x_{Ke}$ of the variables $x_1, x_2, \ldots, x_k, \ldots, x_K$.

11. The method of claim 10 wherein in step (d) G is approximated by $G^*$, $G^*$ being a linearized version of G.

12. The method of claim 10 wherein in step (f) the value of $x_{1c}$ is determined by subtracting $\delta + \delta x_1$ from $x_{1e}$.

13. The method of claim 10 wherein $\delta$ is the $\delta x_1$ resulting from a prior execution of the method of claim 1.

14. Apparatus for practicing the method of claim 1.

15. A method for obtaining an accurate value $x_{1c}$ of a navigation variable $x_1$ based on an estimate $x_{1e}$ that is a function of K variables $x_1, x_2, \ldots, x_k, \ldots, x_K$, the method comprising the steps:

(a) obtaining a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, the values of the variables $x_1, x_2, \ldots, x_k, \ldots, x_K$ changing or being changed during the method-execution time period;

(b) obtaining from an external source the actual values $x_{1a}$ of $x_1$ during the method-execution time period;

(c) defining a compensation model $\delta x_1$ that is a function of one or more of the estimates $x_{1e}, x_{2e}, \ldots, x_{ke}, \ldots, x_{Ke}$ of the variables $x_1, x_2, \ldots, x_k, \ldots, x_K$, the compensation model being further defined by I unknown constants $a_1, a_2, \ldots, a_i, \ldots, a_I$;

(d) applying an operator G to the values of $x_{1e} - x_{1a}$ and $\delta x_1$;

(e) determining the values of $a_1, a_2, \ldots, a_i, \ldots, a_I$;

(f) determining the value of $x_{1c}$.

16. Apparatus for practicing the method of claim 15.

17. Apparatus for obtaining an accurate value $x_{1c}$ of a variable $x_1$ based on an estimate $x_{1e}$ that is a function of K variables $x_1, x_2, \ldots, x_k, \ldots, x_K$, the apparatus comprising:

a means for obtaining from a plurality of sensors a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, the values of the variables $x_1, x_2, \ldots, x_k, \ldots, x_K$ changing or being changed during the method-execution time period;

a means for obtaining from an external source the actual values $x_{1a}$ of $x_1$ during the method-execution time period;

a means for applying an operator G to the values of $x_{1e} - x_{1a}$ and $\delta x_1$, $\delta x_1$ being a compensation model that is a function of one or more of the estimates $x_{1e}, x_{2e}, \ldots, x_{ke}, \ldots, x_{Ke}$ of the variables $x_1, x_2, \ldots, x_k, \ldots, x_K$, the compensation model being further defined by I unknown constants $a_1, a_2, \ldots, a_i, \ldots, a_I$;

a means for determining the values of $a_1, a_2, \ldots, a_i, \ldots, a_I$;

a means for determining the value of $x_{1c}$.

18. The apparatus of claim 17 wherein at least one of the variables $x_1, x_2, \ldots, x_k, \ldots, x_K$ is a time derivative of another variable.

19. The apparatus of claim 17 wherein the compensation model is the sum over i of $a_i f_i(x_{ie})$, $f_i(x_{ie})$ being a set of I basis functions, $x_{ie}$ denoting a set of one or more estimates $x_{1e}, x_{2e}, \ldots, x_{ke}, \ldots, x_{Ke}$ of the variables $x_1, x_2, \ldots, x_k, \ldots, x_K$.

20. The apparatus of claim 19 wherein one or more of the basis functions are polynomials.

21. The apparatus of claim 17 wherein the values of $x_{1e} - x_{1a}$ and $\delta x_1$ obtained prior to present time minus a specified time T contribute negligibly to present-time values of $G(x_{1e} - x_{1a})$ and $G\delta x_1$.

22. The apparatus of claim 17 wherein $G(x_j + x_k)$ does not equal $G(x_j) + G(x_k)$, j and k being integers less than or equal to K.

23. The apparatus of claim 17 wherein the values of $a_i$ are determined by finding the values of $a_i$ that minimize a statistical measure of the magnitude of $G(x_{1e} - x_{1a}) - G\delta x_1(x_{ie})$.

24. The apparatus of claim 17 wherein the values of $a_i$ are determined by finding the values of $a_i$ that minimize a statistical measure of the magnitude of $$G(x_{1e} - x_{1a}) - \sum_i a_i G f_i(x_{ie}).$$

25. The apparatus of claim 17 wherein the value of $x_{1c}$ is determined by subtracting $\delta x_1(x_{ie})$ from $x_{1e}$.

26. The apparatus of claim 17 wherein $x_{1e}$ is equal to $x_{1em}$ minus $\delta$, $x_{1em}$ being a measured value of $x_1$, $\delta$ being a predetermined function of one or more of the estimates $x_{1e}, x_{2e}, \ldots, x_{ke}, \ldots, x_{Ke}$ of the variables $x_1, x_2, \ldots, x_k, \ldots, x_K$.

27. The apparatus of claim 26 wherein G is approximated by $G^*$, $G^*$ being a linearized version of G.

28. The apparatus of claim 26 wherein the value of $x_{1c}$ is determined by subtracting $\delta + \delta x_1$ from $x_{1e}$.

29. The apparatus of claim 17 wherein $\delta$ is the $\delta x_1$ resulting from a prior execution of the method of claim 1.

30. Apparatus for obtaining an accurate value $x_{1c}$ of a navigation variable $x_1$ based on an estimate $x_{1e}$ that is a function of K variables $x_1, x_2, \ldots, x_k, \ldots, x_K$, the apparatus comprising:

a plurality of sensors for obtaining a plurality of estimates $x_{1e}, x_{2e}, \ldots, x_{ke}, \ldots, x_{Ke}$ of the variables $x_1, x_2, \ldots, x_k, \ldots, x_K$ over a method-execution time period, $x_{1e}$ being the output of a navigation sensor, the values of the variables $x_1, x_2, \ldots, x_k, \ldots, x_K$ changing or being changed during the method-execution time period;

a means for obtaining from an external source the actual values $x_{1a}$ of $x_1$ during the method-execution time period;

a means for applying an operator G to the values of $x_{1e} - x_{1a}$ and $\delta x_1$, $\delta x_1$ being a compensation model that is a function of one or more of the estimates $x_{1e}, x_{2e}, \ldots, x_{ke}, \ldots, x_{Ke}$ of the variables $x_1, x_2, \ldots, x_k, \ldots, x_K$, the compensation model being further defined by I unknown constants $a_1, a_2, \ldots, a_i, \ldots, a_I$;

a means for determining the values of $a_1, a_2, \ldots, a_i, \ldots, a_I$;

a means for determining the value of $x_{1c}$.

* * * * *

UNITED STATES PATENT AND TRADEMARK OFFICE
CERTIFICATE OF CORRECTION

PATENT NO. : 6,285,954 B1
DATED : September 4, 2001
INVENTOR(S) : Tazartes et al.

Page 1 of 1

It is certified that error appears in the above-identified patent and that said Letters Patent is hereby corrected as shown below:

<u>Title page,</u>
Item [12], "Mark et al." should be changed to -- Tazartes et al. --
Item [75], the names of the inventors should be changed to
-- Daniel A. Tazartes, West Hills; David I. Tazartes, Beverly Hills; John G. Mark, Pasadena, all of CA (US) --

Signed and Sealed this

Fourteenth Day of May, 2002

*Attest:*

*Attesting Officer*

JAMES E. ROGAN
*Director of the United States Patent and Trademark Office*